US012775436B2

(12) United States Patent
Longhurst

(10) Patent No.: US 12,775,436 B2
(45) Date of Patent: Oct. 27, 2026

(54) PREDICTIVE TEXT RENDERING FOR VIRTUAL DESKTOP APPLICATIONS

(71) Applicant: HP Technology Holdings LLC, Palo Alto, CA (US)

(72) Inventor: Peter William Longhurst, Burnaby (CA)

(73) Assignee: HP Technology Holdings LLC, Palo Alto, CA (US)

( * ) Notice: Subject to any disclaimer, the term of this patent is extended or adjusted under 35 U.S.C. 154(b) by 170 days.

(21) Appl. No.: 18/420,520

(22) Filed: Jan. 23, 2024

(65) Prior Publication Data

US 2025/0238611 A1 Jul. 24, 2025

(51) Int. Cl.
*G06F 3/14* (2006.01)
*G06F 9/451* (2018.01)
*G06F 40/274* (2020.01)
*G06F 3/023* (2006.01)

(52) U.S. Cl.
CPC ............ *G06F 3/1462* (2013.01); *G06F 9/452* (2018.02); *G06F 40/274* (2020.01); *G06F 3/0237* (2013.01)

(58) Field of Classification Search
CPC ....... G06F 3/1462; G06F 9/452; G06F 40/274
See application file for complete search history.

(56) References Cited

U.S. PATENT DOCUMENTS

| | | | | |
|---|---|---|---|---|
| 6,538,667 B1 * | 3/2003 | Duursma | H04L 67/025 | 715/740 |
| 11,489,845 B1 * | 11/2022 | Feng | G06F 16/986 | |
| 2008/0126075 A1 * | 5/2008 | Thorn | G06F 3/0237 | 704/3 |
| 2011/0117895 A1 * | 5/2011 | Robertson | H04W 28/14 | 455/414.1 |
| 2012/0084670 A1 * | 4/2012 | Momchilov | H04W 4/023 | 715/753 |

(Continued)

OTHER PUBLICATIONS

John R. Lange, Peter A. Dinda, and Samuel Rossoff, Experiences with client-based speculative remote display, 2008 USENIX Annual Technical Conference (USENIX ATC 08), usenix.org/legacy/event/usenix08/tech/full_papers/lange/lange_html/> and <https://users.cs.northwestern.edu/~pdinda/Papers/usenix08.pdf (2008).*

(Continued)

*Primary Examiner* — Justin R. Blaufeld
(74) *Attorney, Agent, or Firm* — Quarles & Brady LLP

(57) ABSTRACT

Methods, systems, devices, and media that can be used for predictive text rendering for virtual desktop applications. Predictive text rendering can include receiving a keystroke input associated with a virtual desktop application window on a client device, transmitting the keystroke input associated with the virtual desktop application window to a host computing system that processes the keystroke input to provide a ground truth text rendering, generating a predicted text rendering associated with the keystroke input prior to receiving the ground truth text rendering from the host computing system, and causing the client device to present the predicted text rendering via the virtual desktop application window prior to receiving the ground truth text rendering from the host computing system.

20 Claims, 4 Drawing Sheets

(56) References Cited

U.S. PATENT DOCUMENTS

| | | | | |
|---|---|---|---|---|
| 2016/0042545 | A1* | 2/2016 | Hiraki | G06F 3/1454<br>345/619 |
| 2016/0078656 | A1* | 3/2016 | Borson | G06F 40/109<br>345/472 |
| 2016/0219325 | A1* | 7/2016 | Chu | A63F 13/35 |
| 2016/0350062 | A1* | 12/2016 | Katsumata | G09G 5/12 |
| 2017/0249292 | A1* | 8/2017 | Constable | G06F 40/205 |
| 2017/0285932 | A1* | 10/2017 | Hastings | G06F 3/04883 |
| 2018/0004546 | A1* | 1/2018 | Ferras Pereira | G06F 3/0227 |
| 2018/0082156 | A1* | 3/2018 | Jin | G06F 40/109 |
| 2020/0050467 | A1* | 2/2020 | Dobson | G06F 3/1454 |
| 2020/0252413 | A1* | 8/2020 | Buzbee | G06F 11/3656 |
| 2020/0258140 | A1* | 8/2020 | Xu | G06V 20/40 |
| 2020/0310834 | A1* | 10/2020 | Momchilov | G06F 8/38 |
| 2021/0342216 | A1* | 11/2021 | Dines | G06F 11/0706 |
| 2022/0197676 | A1* | 6/2022 | Dines | G06F 8/34 |
| 2023/0041844 | A1* | 2/2023 | Feng | G06F 16/986 |
| 2023/0229869 | A1* | 7/2023 | Pan | G06F 9/454<br>715/271 |
| 2024/0071338 | A1* | 2/2024 | Liu | G06F 3/1454 |
| 2024/0248585 | A1* | 7/2024 | Sakabe | G06F 3/0484 |

OTHER PUBLICATIONS

John R. Lange, Peter A. Dinda, and Samuel Rossoff, Experiences with client-based speculative remote display, 2008 USENIX Annual Technical Conference (USENIX ATC 08), usenix.org/legacy/event/usenix08/tech/full_papers/lange/lange_html/> and <https://users.cs.northwestern.edu/~pdinda/Papers/usenix08.pdf (Year: 2008).*

* cited by examiner

PREDICTIVE TEXT RENDERING FOR VIRTUAL DESKTOP APPLICATIONS

BACKGROUND

Remote desktop and virtual desktop infrastructure (VDI) technology involves sending mouse, keyboard, and other inputs from a client device over a network to a host computing system. The host computing system then processes the inputs and sends a result back to the client device. The use of remote desktop and VDI technology can provide various benefits in different computing applications.

BRIEF DESCRIPTION OF THE DRAWINGS

The accompanying drawings, which form a part of this specification, illustrate examples of the disclosure and, together with the description, explain principles of the examples.

DETAILED DESCRIPTION

The present disclosure provides methods, systems, devices, and media for predictive text rendering for virtual desktop applications. When using some of the previous approaches to implementing virtual and remote desktop technologies, users can experience significant delays (e.g., half of a second, full second, multiple seconds, etc.) between pressing a key to enter text and seeing the associated text appear on a display. The approaches described herein can be used to reduce this apparent latency and provide a better remoting experience for users attempting to use remote computing resources over high latency network links. The approaches described herein can also provide bandwidth savings in certain scenarios when text rendering can be accurately predicted by the client device.

The approaches described herein can include aligning optical character recognition (OCR) techniques on text appearing in an image or a video stream associated with a remoting experience with previously captured keystroke inputs. Then, text can be predictively rendered based on the information gleaned from this character recognition. This predictive rendering can also be referred to as preemptive rendering. In previous approaches, the time to render a keypress on a client screen in a virtual desktop system can be a products of keyboard input time+client to host network latency+keypress injection time+rendering time+display capture time+image encoding time+encoded image to network time+host to client network latency+encoded image from network time+image decoding time+client rendering time, for example, among other possible contributing factors. The approaches described herein can mitigate the network rendering delays by making an intelligent guess as to the result of a keypress based on recent keypress history.

The technology described herein can be implemented as part of an image codec used for remoting or can be external and supplemental to an image codec, for example. The technology described herein can benefit from knowing the region of change in the images received by the client device to cut down the search space. The technology described herein can also allow for measurement of interactive latency (e.g., the time from the keypress being registered to it arriving as pixel data from the host to the client display) to provide a predictor of user experience fidelity.

Figure 1:
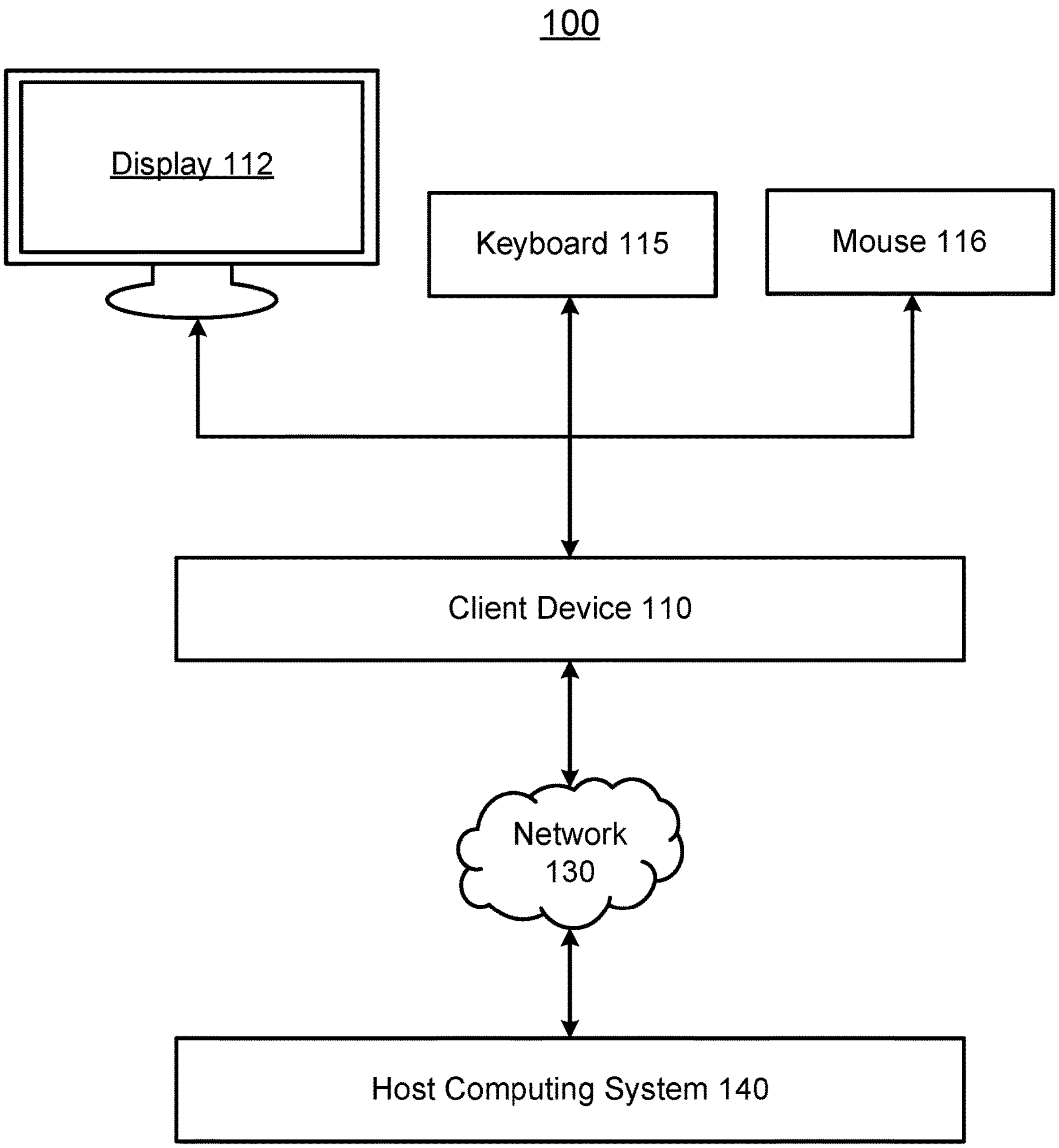
FIG. 1 is a block diagram illustrating an example system for predictive text rendering in virtual desktop applications, in accordance with some aspects of the disclosure.

Referring to FIG. 1, a block diagram illustrating an example system 100 for predictive text rendering in virtual desktop applications is shown, in accordance with some aspects of the disclosure. As shown, the system 100 includes a client device 110 that communicates with a host computing system 140 via a network 130. Additionally, the client device 110 communicates with a display 112, a keyboard 115, and a mouse 116. In some implementation of the client device 110 (e.g., as a laptop, as a desktop computer, etc.), the display 112, the keyboard 115, and/or the mouse 116 can be components of the client device 110 and/or can be separate from but connected to (e.g., via a Universal Serial Bus (USB) dongle, etc.) the client device 110 to provide inputs to the client device 110. Also, the system 100 can include additional and/or alternative components besides what is expressly illustrated in FIG. 1. For example, the client device 110 can be connected to a docking station, the client device 110 can be connected to multiple separate displays, the client device 110 can receive inputs via a touch screen interface (e.g., such that the keyboard 115 and/or the mouse 116 are not necessarily needed), the client device 110 can receive inputs through an audio interface (e.g., voice recognition, etc.), and various other possible implementations of the system 100.

The client device 110 can be any of a variety of suitable types of electronic computing devices that can interact with the host computing system 140. For example, the client device 110 can be a personal computer (PC) such as, for example, a laptop, a desktop computer, a tablet, a smartphone, a thin client device, a notebook device, a wearable device, or any other suitable type electronic computing device. The interaction between the client device 110 and the host computing system 140 can provide at least some level of virtualization in terms of the operation of the client device 110. For example, the host computing system 140 can provide remote desktop virtualization for the client device 110 where application execution is performed by the host computing system 140 and data is retained by the host computing system 140. In such an implementation, the host computing system 140 can then communicate display, keyboard, and mouse information to the client device 110 (e.g., via the virtual desktop application 125 as detailed below).

The network 130 can be implemented using any suitable type and/or types of electronic communication networks, such as, for example, a Wi-Fi network, a peer-to-peer network (e.g., a Bluetooth network, a cellular network (e.g., a 3G network, a 4G network, a 5G network, etc., complying with any suitable standard(s), such as, for example, CDMA, GSM, LTE, LTE Advanced, WiMAX, 5G NR, etc.)), a wired network (e.g., an Ethernet network), etc. The network 130 can further be implemented using a local area network (LAN), a wide area network (WAN), a public network (e.g., the Internet, which may be part of a WAN and/or LAN), a private or semi-private network (e.g., a corporate intranet), and/or any other suitable types of networks and communication protocols. As detailed further below, a latency period associated with a network connection between the client device 110 and the host computing system 140 via the network 130 can be used to determine whether or not to activate predictive text rendering functionality.

The host computing system 140 can be implemented in a variety of suitable manners using different types of hardware and/or software configurations. For example, the host computing system 140 can be implemented using computing resources in one or more remote data centers (e.g., one or more cloud computing systems). The host computing system 140 can thereby provide virtualization of desktop components to support more robust desktop recovery functionality and to provide more flexible and secure desktop delivery. In addition to desktop virtualization functionality, the host computing system 140 can additionally and/or alternatively provide other virtualization functionality, such as, for example, presentation virtualization, user virtualization, application virtualization, layering, and/or other virtualization functionality that can enable deployment of virtual machines. The host computing system 140 can include various virtualization components such as, for example, different types of hypervisors, emulators, and/or other components.

The display 112 can be implemented in a variety of suitable manners depending on the implementation of the client device 110 and/or the use of the client device 110 by a user. For example, the display 112 can be implemented using one or more display devices that are separate from but connected to the client device 110. For example, the display 112 can include a liquid crystal display (LCD) monitor, a light-emitting diode (LED) monitor, an organic light-emitting diode (OLED) monitor, a plasma display monitor, a cathode ray tube (CRT) monitor, a television, a meeting room display device, and/or any other suitable types and/or combinations of display devices. The display 112 can also be implemented as a built-in display that is an integral component of the client device 110. For example, the display 112 can be a built-in display on a laptop, a built-in display on a tablet, a built-in display on a smartphone, a built-in display on a wearable device, etc. The display 112 can be touch-sensitive in some examples such that the display 112 can receive touch inputs from a user.

The keyboard 115 and the mouse 116 can likewise be implemented in a variety of suitable manners depending on the implementation of the client device 110 and/or the use of the client device 110 by a user. They keyboard 115 can be any suitable type of keyboard such as, for example, a QWERTY keyboard, a wired keyboard, a wireless keyboard, a virtual keyboard (e.g., presented on a touch-screen interface via the display 112), an ergonomic keyboard, or another type of keyboard. The keyboard 115 can be separate from but connected to the client device 110 or can be built-in keyboard that is integral to the client device 110. Similarly, the mouse 116 can be any suitable type of mouse such as, for example, a wired mouse, a wireless mouse, a laser mouse, a trackball mouse, a virtual mouse (e.g., a cursor on a touch-screen interface via the display 112) or another type of mouse. The mouse 116 can be separate from but connected to the client device 110 or can be built-in keyboard that is integral to the client device 110. Depending on the application, the keyboard 115 could be implemented using more than one keyboard and/or the mouse 116 could be implemented using more than one mouse.

Figure 2:
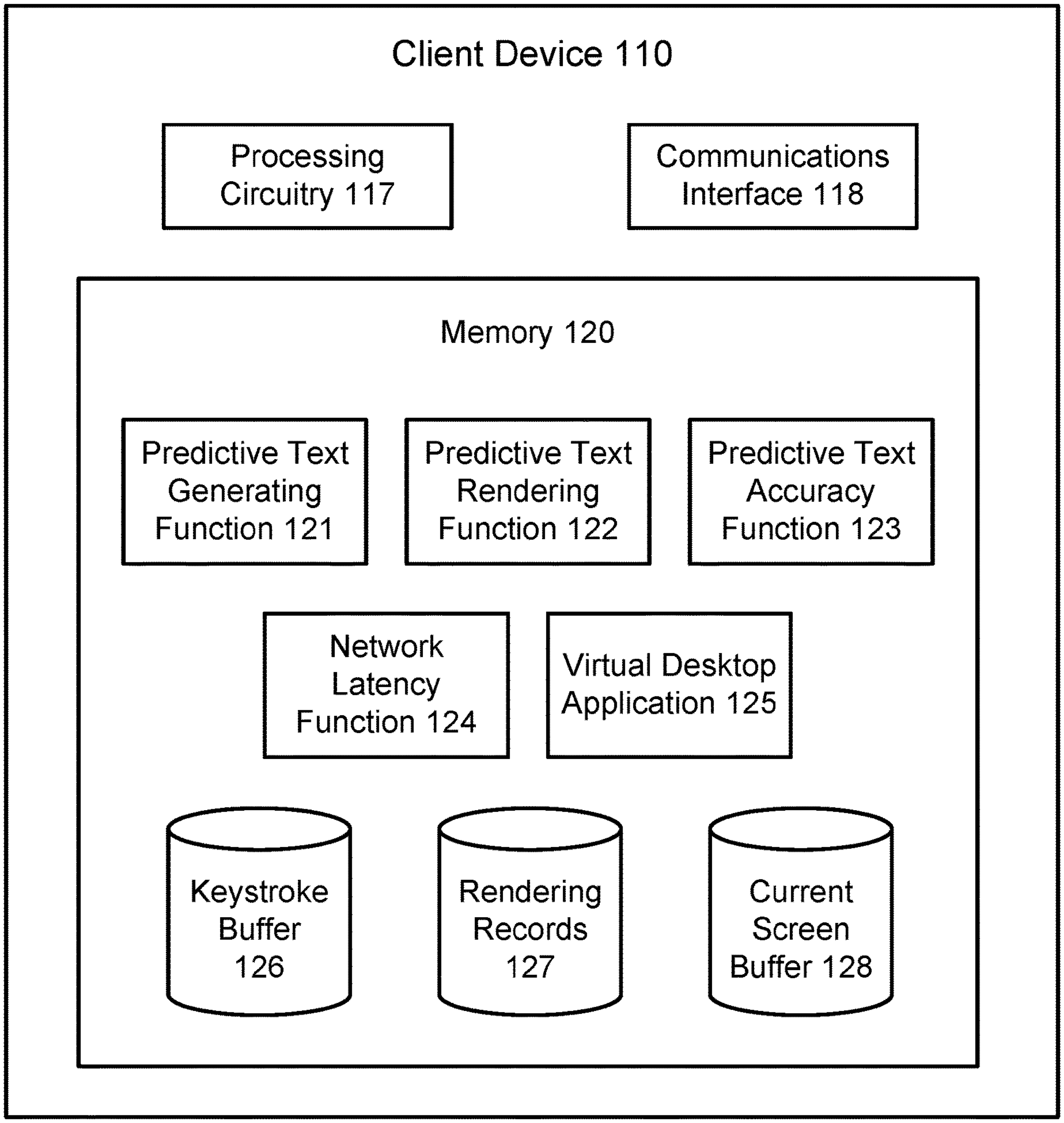
FIG. 2 is a block diagram illustrating example components of a client device in the system of FIG. 1, in accordance with some aspects of the disclosure.

Referring to FIG. 2, a block diagram illustrating example components of the client device 110 in the system 100 is shown, in accordance with some aspects of the disclosure. As shown, the client device 110 includes processing circuitry 117, a communications interface 118, and also a memory 120. The memory 120 includes various components such as, for example, a predictive text generating function 121, a predictive text rendering function 122, a predictive text accuracy function 123, a network latency function 124, a virtual desktop application 125, a keystroke buffer 126, rendering records 127, and a current screen buffer 128. The predictive text generating function 121, the predictive text rendering function 122, the predictive text accuracy function 123, the network latency function 124, and the virtual desktop application 125 can include machine-readable instructions that can be retrieved and executed by the processing circuitry 117, for example, for the client device 110 to perform the associated actions described herein. The component shown in FIG. 2 can provide predictive text rendering functionality to improve user experience in virtual computing applications. The components shown in FIG. 2 are provided as examples to help illustrate the disclosed subject matter, and the client device 110 can include additional and/or alternative components beyond what is expressly shown in FIG. 2. Moreover, one or more of the components shown in FIG. 2 can be combined in various ways such that they are implemented as a single component instead of separate components as illustrated.

The processing circuitry 117 can be implemented using any a suitable hardware processor or combination of hardware processors, including using central processing units (CPU), graphics processing units (GPU), and/or other types of hardware processing components. The processing circuitry 117 can further be implemented using a suitable number of processing cores, including single core processors, dual core processors, and/or other types of processor core configurations. The processing circuitry 117 can execute machine-readable instructions stored in the memory 120 to perform various operations for the client device 110. For example, the processing circuitry 117 can execute the virtual desktop application 125 to communicate with the host computing system 140 and provide desktop virtualization functionality.

The communications interface 118 can include any suitable hardware, firmware, and/or software for communicating data over suitable types of communication networks, including the network 130 and/or other communication networks that can be accessed by the client device 110. For example, the communications interface 118 can include one or more transceivers, one or more communication chips and/or chip sets, one or more antennas and/or radios, and other suitable types of electronic components that facilitate electronic communications. The communications interface 118 can include hardware, firmware, and/or software that can be used by the client device 110 to establish a Wi-Fi connection, a Bluetooth connection, a cellular network connection, an Ethernet connection, and/or other similar types of connections, for example. Data associated with electronic communications occurring via the communications interface 118 can be stored in the memory 120.

The memory 120 can include any suitable storage device or devices that can be used to store machine-readable instructions, data, etc., that can be used by the processing circuitry 117 to present content via the display 112, to communicate with other computing devices (e.g., the host computing system 140), and/or to perform various other operations. The memory 120 can include suitable types of memory including different types of volatile memory, non-volatile memory, random-access memory (RAM), read-only memory (ROM), electrically erasable programmable read-only memory (EEPROM), one or more flash drives, one or more hard disks, one or more add on (expansion) cards (e.g., GPU memory, etc.), one or more solid state drives, one or more optical drives, and/or other types of memory. The memory 120 can include non-transitory computer readable storage media having instructions stored thereon for execution by the processing circuitry 117 to implement operations. The processing circuitry 117 can execute different programs stored in the memory 120 to transmit information and/or content (e.g., results of a database query, a portion of a user interface, textual information, graphics, and the like) to different computing devices and systems, receive information and/or content from different computing devices and systems, receive instructions from different computing devices and systems, and/or other types of operations.

The virtual desktop application 125 can include any suitable software for facilitating any type of virtualization functionality between the host computing system 140 and the client device 110. For example, a user of the client device 110 can launch the virtual desktop application 125 to access a virtual desktop maintained by the host computing system 140 via the client device 110. For example, to launch, a user can select an icon corresponding to the virtual desktop application 125 displayed on the display 112, causing the processing circuitry 117 to retrieve the virtual desktop application 125 from the memory 120 and execute the virtual desktop application 125. Upon launching the virtual desktop application 125, the virtual desktop application 125 can cause a virtual desktop application window 113 to be presented on the display 112, as detailed further below with respect to FIG. 3. Then, via the virtual desktop application window 113, the user of the client device 110 can perform any of a variety of computing functions via the virtual desktop that is maintained by the host computing system 140. For example, the user of the client device 110 can launch a web browser via the virtual desktop, launch an email application via the virtual desktop, launch a word processing application via the virtual desktop, launch a spreadsheet application via the virtual desktop, etc.

The host computing system 140 can execute the application(s) requested by a user, receive and process user inputs entered via the client device 110, generate outputs based on the user inputs, and ultimately render a virtual desktop (e.g., as a series of frames and/or partial frames at a frame rate). The host computing system 140 can transmit the rendered virtual desktop via the network 130 to the client device 110 for display, via the virtual desktop application window 113 on the display 112. Accordingly, although the application(s) are executing at the host computing system 140, the experience of a user at the client device 110 using the virtual desktop application 125 can generally be as if the client device 110 were executing the application(s), for example, if network latency is sufficiently low and the frame rate is sufficiently high. The virtual desktop application 125 can be downloadable to and removable from the memory 120. The virtual desktop application 125 can also include the predictive text generating function 121, the predictive text rendering function 122, the predictive text accuracy function 123, and/or the network latency function 124, in some examples. The virtual desktop application 125 can also include instructions for creating the keystroke buffer 126, the rendering records 127, and/or the current screen buffer 128 in the memory 120, in some examples.

The predictive text generating function 121 can include instructions for generating predicted text renderings associated with keystroke inputs entered via the client device 110. Advantageously, the predictive text generating function 121 can generate the predicted text renderings associated with the keystroke inputs entered via the client device 110 before the associated ground truth text renderings are received from the host computing system 140 in a virtual desktop environment. As such, the predicted text renderings generated by the predictive text generating function 121 can be used to preemptively render text via the display 112 in certain scenarios to improve the experience of the user of the client device 110. The predictive text generating function 121 can generate the predicted text renderings associated with the keystroke inputs entered via the client device 110 based on information such as, for example, the most recent keystrokes (e.g., as stored in the keystroke buffer 126) and/or the most recent text renderings (e.g., as stored in the rendering records 127), as discussed in more detail below. The predictive text generating function 121 can use various types of OCR techniques to analyze the most recent text renderings, for example. In some implementations, the predictive text generating function 121 can be split into two separate functions. A first function can include instructions for recognizing prior text (e.g., recognizing text in the most recent update zone 310 using OCR techniques) and a second function can include instructions for generating predicted text renderings based on the recognized prior text.

The predictive text rendering function 122 can include instructions for causing the client device 110 to present the predicted text renderings generated by the predictive text generating function 121 via the display 112. Advantageously, the predictive text rendering function 122 can be designed to cause the client device 110 to present the predicted text renderings generated by the predictive text generating function 121 via the display 112 in response to certain conditions are met. The conditions can include determining that the accuracy of the predicted text renderings generated by the predictive text generating function 121 exceeds an accuracy threshold, determining that a latency period associated with a network connection between the client device 110 and the host computing system 140 (e.g., a connection via the network 130) exceeds a latency threshold, and/or other possible conditions. In this manner, the client device 110 can cause the predicted text renderings generated by the predictive text generating function 121 to be presented via the display 112 if and when the predictive text rendering function 122 determines that it is desirable to do so. Similarly, the client device 110 can disable or inhibit predicted text rendering when the predictive text rendering function 122 determines that such rendering is not desirable (e.g., when one or more of the noted conditions are not satisfied).

For example, if the predicted text renderings generated by the predictive text generating function 121 are not accurate enough, the predictive text rendering function 122 can determine that the predicted text renderings generated by the predictive text generating function 121 should not be presented. As another example, if the user of the client device is not experiencing a significant enough delay between keystroke inputs and text renderings because the latency period associated with the network connection between the client device 110 and the host computing system 140 is low, the predictive text rendering function 122 can again determine that the predicted text renderings generated by the predictive text generating function 121 should not be presented. As another example, if the client device 110 receives an input including a predetermined keystroke combination (e.g., copy and paste, shortcuts, etc.) or a mouse action (e.g., moving cursor, dragging or resizing an active window, etc.), the client device 110 can accordingly deactivate the predictive text rendering function 122 to prevent the predicted text renderings generated by the predictive text generating function 121 from being presented via the display 112. If the predictive text rendering function 122 determines that the predicted text renderings generated by the predictive text generating function 121 should not be presented for whatever reason, the virtual desktop application 125 (or another component) can advantageously deactivate one or more of the predictive text generating function 121, the predictive text rendering function 122, the predictive text accuracy function 123, and/or the network latency function 124 in effort to conserve computing resources for the client device 110.

The predictive text accuracy function 123 can include instructions for evaluating the predicted text renderings generated by the predictive text generating function 121 responsive to keystroke inputs entered via the client device 110. For example, the rendering records 127 can store both predicted text renderings generated by the predictive text generating function 121 as well as the associated ground truth text renderings received from the host computing system 140 over a given time period. Then, the predictive text accuracy function 123 can compare the stored predicted text renderings generated by the predictive text generating function 121 to the associated ground truth text renderings received from the host computing system 140 to determine the accuracy of the predicted text renderings generated by the predictive text generating function 121. The accuracy of the predicted text renderings generated by the predictive text generating function 121 can be expressed in various ways. For example, the accuracy of the predicted text renderings generated by the predictive text generating function 121 can be expressed as a percentage of pixels that have matching values between the predicted text renderings generated by the predictive text generating function 121 and the associated ground truth text renderings received from the host computing system 140 (e.g., 80%, 85%, 90%, etc.). The predictive text accuracy function 123 can also compare the determined accuracy of the predicted text renderings generated by the predictive text generating function 121 to an accuracy threshold and provide an output (e.g., a Boolean value) indicating whether or not the determined accuracy of the predicted text renderings generated by the predictive text generating function 121 exceeds the accuracy threshold. The accuracy threshold can be predetermined and "hard-coded" into the predictive text generating function 121 or can be configurable by an organization, by a user, etc.

The network latency function 124 can include instructions for evaluating the network connection between the client device 110 and the host computing system 140 (e.g., via the network 130). For example, the network latency function 124 can cause the communications interface 118 of the client device 110 to ping the host computing system 140 via the network 130 and determine the latency period associated with the network connection between the client device 110 and the host computing system 140 accordingly. For example, the latency period of a ping can be the time between a ping request being sent by the client device 110 to the host computing system 140 and a ping reply being received, in response to the ping request, by the client device 110 from the host computing system 140. Various alternative or additional approaches can also be used by the network latency function 124 to determine the latency period latency period associated with the network connection between the client device 110 and the host computing system 140. Then, the latency function 124 can compare the determined latency period to a latency threshold and provide an output (e.g., a Boolean value) indicating whether or not the determined latency period exceeds the latency threshold. The latency threshold can be predetermined and "hard-coded" into the network latency function 124 or the latency threshold can be configurable by an organization, by a user, etc. similar to the accuracy threshold.

The keystroke buffer 126 can be implemented in the memory 120 to store the most recent keystroke inputs that are entered via the client device 110. For example, each time a user of the client device presses a key on the keyboard 115, the associated keystroke input can be stored in the keystroke buffer 126. However, if a user performs a mouse action (e.g., clicking, moving the cursor, etc.), then the contents of the keystroke buffer 126 can be cleared. The keystroke buffer 126 can be implemented in various ways depending on the implementation of the client device 110. For example, the keystroke buffer 126 can be implemented using any suitable types and/or combinations of buffers, such as, for example, a single buffer, a double buffer, a circular buffer, and/or any other suitable type of buffer available in the memory 120. The keystroke buffer 126 provides a storage mechanism for the predictive text generating function 121 to access such that the predictive text generating function 121 can use the most recent keystrokes contained in the keystroke buffer 126 to generate predicted text renderings associated with the keystroke inputs entered via the client device 110 before the client device 110 receives the associated ground truth text renderings from the host computing system 140. The keystroke buffer 126 can be a rolling buffer that stores the last N keypresses, for example. The keystroke buffer 126 can be used to store timestamps associated with keypresses such that the timestamps can be used to enable latency calculations and other more dynamic functionality.

The rendering records 127 can be implemented in the memory 120 to store both predicted text renderings generated by the predictive text generating function 121 (and potentially rendered by the predictive text rendering function 122) as well as ground truth text renderings received by the client device 110 from the host computing system 140. The rendering records 127 can store this information over any suitable time period, and the information can be cleared from the rendering records 127 responsive to a variety of different events (e.g., storage limit reached, virtual session ended, etc.). The rendering records 127 can be used by the predictive text accuracy function 123 to evaluate the accuracy of the predicted text renderings generated by the predictive text generating function 121. The rendering records 127 can also be used to replace predicted text renderings that the predictive text rendering function 122 causes the client device 110 to present via the display 112 with the appropriate ground truth text renderings received by the client device 110 from the host computing system 140 as the ground truth text renderings are received by the client device 110 from the host computing system 140. The rendering records 127 can be used to store timestamps associated with both predicted text renderings generated by the predictive text generating function 121 (and potentially rendered by the predictive text rendering function 122) as well as ground truth text renderings received from the host computing system 140 such that the timestamps can be used to enable latency calculations and other more dynamic functionality.

The current screen buffer 128 can be implemented in the memory 120 to store the current screen information that is presented by the client device 110 via the display 112. For example, the current screen buffer 128 can store a pixel map containing the contents for presenting by the client device 110 via the display 112. The current screen buffer 128 can provide an efficient mechanism for the processing circuitry 117 to access the data used to present a given screen via the display 112. As the ground truth text renderings are received by the client device 110 from the host computing system 140, the processing circuitry 117 can update the contents of the current screen buffer 128 accordingly.

In the above discussion of the predictive text generating function 121, the predictive text rendering function 122, the predictive text accuracy function 123, the network latency function 124, and the virtual desktop application 125, the functions are, in some instances, described as performing an action or actions. In at least some examples, the predictive text generating function 121, the predictive text rendering function 122, the predictive text accuracy function 123, the network latency function 124, and the virtual desktop application 125 are executed by the processing circuitry 117 to perform such action or actions. Accordingly, the processing circuitry 117 (e.g., through execution of instructions of the predictive text generating function 121, the predictive text rendering function 122, the predictive text accuracy function 123, the network latency function 124, and/or the virtual desktop application 125 retrieved from the memory 120) can also be considered as performing such action or actions. Additionally, any action or actions described as being performed by the client device 110 can be performed more specifically by the processing circuitry 117 responsive to executing instructions stored in the memory 120.

Figure 3:
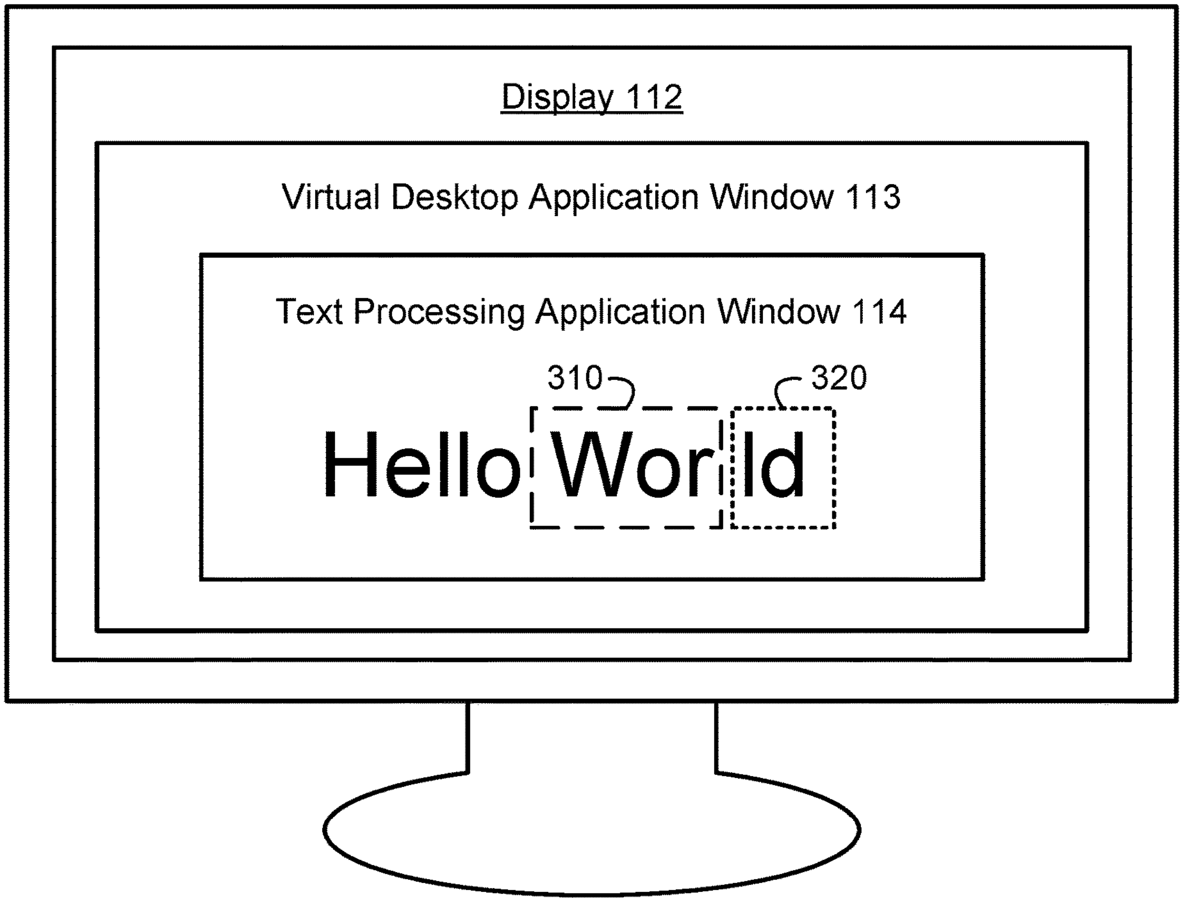
FIG. 3 is an example illustration of a display associated with the client device of FIG. 2, in accordance with some aspects of the disclosure.

Referring to FIG. 3, an example illustration of the display 112 associated with the client device 110 in the system 100 is shown, in accordance with some aspects of the disclosure. As shown, the display 112 includes a virtual desktop application window 113 and a text processing application window 114 that is presented within the virtual desktop application window 113. As noted, a user of the client device 110 can launch the virtual desktop application 125 on the client device 110 (e.g., by selecting a desktop icon associated with the virtual desktop application 125, etc.) and then the virtual desktop application 125 can cause the virtual desktop application window 113 to be presented on the display 112. The virtual desktop application window 113 can be a full screen window that takes up most or all of the pixels of the display 112 (e.g., when the virtual desktop application window 113 is maximized). The virtual desktop application window 113 can also be a partial screen window that takes up only a portion of the pixels of the display 112). The virtual desktop application window 113 can also be minimized such that, at least for a period of time, the virtual desktop application window 113 does not take up any pixels of the display 112. Via the virtual desktop application window 113, the user of the client device 110 can then launch the text processing application window 114. The text processing application window 114 can be any suitable type of application window through which the user of the client device 110 can enter text and visualize the entered text via the display 112. For example, the text processing application window 114 can be a web browser, an email client, a word processing application, a spreadsheet application, or any other suitable type of computing application.

As shown in FIG. 3, as the user of the client device 110 enters text via the text processing application window 114 (e.g., using the keyboard 115), the text can be split into two main zones: a most recent update zone 310 and a prediction zone 320. The most recent update zone 310 can include any new characters that were included in one or more recent screen updates received from the host computing system 140. In the example shown in FIG. 3, the most recent update zone 310 includes three characters (‘W’, ‘o’, and ‘r’), however the most recent update zone 310 can include any suitable number of characters. The prediction zone 320 can include any character predictions that are generated by the predictive text generating function 121 and rendered by the predictive text rendering function 122 before the associated ground truth text renderings are received from the host computing system 140. In the example shown in FIG. 3, the prediction zone 320 includes two characters (‘l’ and ‘d’), however the prediction zone 320 can likewise include any suitable number of characters. The predictive text generating function 121 can use information about the most recent update zone 310 to influence the character predictions for the prediction zone 320 such as, for example, the font of the characters in the most recent update zone 310 and/or other information.

Figure 4:
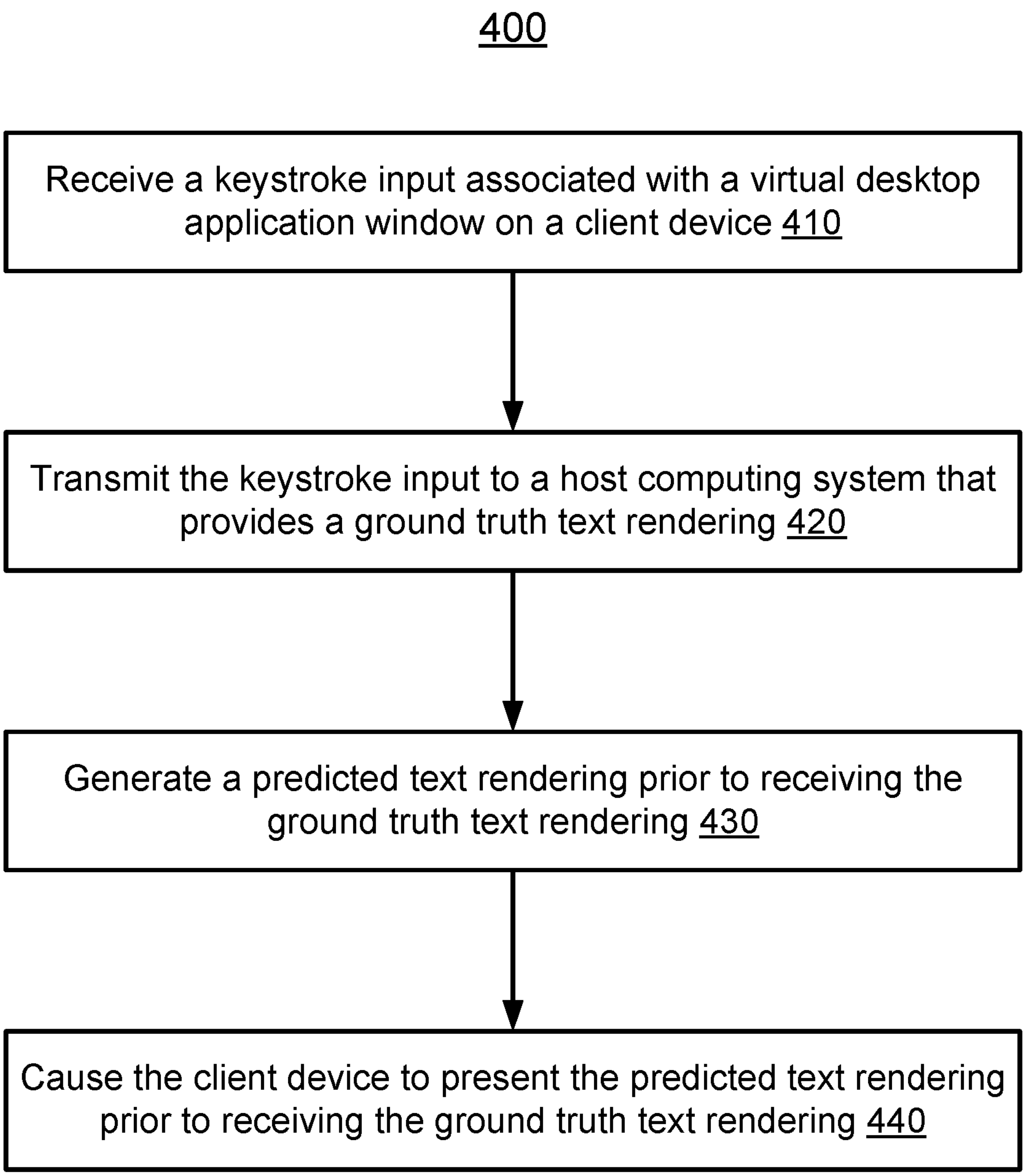
FIG. 4 is a flow diagram illustrating an example process for predictive text rendering in virtual desktop applications that can be performed using the system of FIG. 1, in accordance with some aspects of the disclosure.

Referring to FIG. 4, another flow diagram illustrating another example process 400 for predictive text rendering in virtual desktop applications is shown, in accordance with some aspects of the disclosure. The process 400 can be performed by software executing on the client device 110, for example. The process 400 can generally be used to improve the experience for users of virtual desktop technology, for example, in text processing applications. For example, the process 400 can be particularly beneficial for task workers or other workers with a workload that is predominantly textual in nature such as, for example, document authoring, computer coding, emailing, data entry, and various other tasks that can be performed by different users using virtual desktop technology. In approaches without predictive text rendering, users can experience significant lag times when the device they are using has a poor network connection to a host. In some examples, users can experience a noticeable delay of anywhere from around a half of a second to multiple seconds between pressing a key and seeing the appropriate character appear on their screen. However, the process 400 can be used to provide predictive text rendering to reduce this delay and provide an improved user experience.

At 410, the process 400 can include receiving a keystroke input associated with a virtual desktop application window on a client device. For example, the client device 110 can receive a keystroke input that is entered via the keyboard 115. The keystroke input received at 410 can be entered via the client device 110 directly or indirectly (e.g., in implementations where the keyboard 115 is an external keyboard connected to the client device 110). Likewise, the virtual desktop application window 113 can be “on” the client device directly (e.g., when the display 112 is built-in to the client device 110) or indirectly (e.g., when the display 112 is an external display connected to the client device). The keystroke input received at 410 can be associated with the virtual desktop application window 113, for example because the virtual desktop application window 113 and/or the text processing application window 114 are active (e.g., selected and in use) on the client device at a time when the keystroke input is received at 410.

The keystroke input received at 410 can include a text character (e.g., ‘a’, ‘b’, ‘c’, etc.) for entering via the text processing application window 114, for example. The client device 110 can store the keystroke input received at 410 in the keystroke buffer 126. The keystroke buffer 126 can include a collection of the most recent N keypresses received by the client device 110. The client device 110 can clear the keystroke buffer 126 responsive to determining that a clear condition has been met. For example, the client device 110 can determine that the clear condition has been met responsive to determining that keystroke buffer 126 includes a maximum number of entries, determining that a timeout period has elapsed since the most recent addition to the keystroke buffer 126 was made, receiving a mouse action (e.g., an input from the mouse 116) and/or determining that a predetermined keystroke combination has been received by the client device 110 (e.g., a copy shortcut key combination, a paste shortcut key combination, or shortcut key combinations, etc.). The client device 110 can fully clear the keystroke buffer 126 responsive to determining that a clear condition has been met or can partially clear the keystroke buffer 126 responsive to determining that a clear condition has been met. For example, the client device 110 can partially clear the keystroke buffer 126 by only removing keystrokes that have been stored in the keystroke buffer 126 for longer than a predetermined period of time, and/or the client device 110 partially clear the keystroke buffer 126 by only keeping keystrokes that are associated with the rendering records 127.

The mouse action can include clicking, moving a cursor, or any other type of mouse action that can be performed by a user of the client device 110 using the mouse 116. The mouse action can indicate that the prediction zone 320 and/or the most recent update zone 310 has been reset, and accordingly the client device 110 can clear the keystroke buffer 126 responsive to receiving the mouse action. The mouse action can also include actions such as, for example, dragging or resizing the text processing application window 114 or the virtual desktop application window 113, minimizing the text processing application window 114 or the virtual desktop application window 114, surfacing an application window, home screen, etc. on the client device 110 instead of the virtual desktop application window 113, or any of a variety of other actions that can be performed using the mouse 116.

At 420, the process 400 can include transmitting the keystroke input to a host computing system that provides a ground truth text rendering associated with the keystroke input for presentation by the client device via the virtual desktop application window. For example, the client device 110 can transmit the keystroke input received at 410 to the host computing system 140 via the network 130. Then, the host computing system 140 can provide the ground truth text rendering back to the client device 110. The host computing system 140 can send a full screen update back to the client device 110 that includes the ground truth text rendering associated with the keystroke input received at 410. Alternatively, to conserve bandwidth and/or computing resources, the host computing system 140 can provide the ground truth text rendering back to the client device 110 in some scenarios as a correction/update to the predicted text rendering generated by the client device 110, as explained further below.

At 430, the process 400 can include generating a predicted text rendering prior to receiving the ground truth text rendering from the host computing system. For example, the client device 110 can execute the predictive text generating function 121 to generate the predicted text rendering at 430 prior to receiving the ground truth text rendering from the host computing system 140. The client device 110 can execute the predictive text generating function 121 to generate the predicted text rendering at 430 based on text that is already presented via the virtual desktop application window 113 on the client device 110. For example, the predictive text generating function 121 can use various types of OCR techniques to analyze one or more character glyphs contained in the most recent update zone 310 to detect or learn a pattern of text. The pattern can include a font, a font size, a color (e.g., a text color and/or a background color), a level of spacing, and a location within the virtual desktop application window 113 (and/or the text processing application window 114), for example, and the predictive text generating function 121 can generate the predicted text rendering at 430 based on the pattern (e.g., the predicted text rendering can have the same font, size, color, level of spacing, and/or other parameters in accordance with the pattern). For example, the predictive text generating function 121 can include instructions to isolate a character glyph contained in the most recent update zone 310, obtain pixel data associated with the isolated character glyph, and compare the pixel data to database of character glyphs to determine a closest matching character glyph, where each character glyph in the database of character glyphs is associated with particular parameters such as, for example, font, size, and/or color. The predictive text generating function 121 can also analyze nearby text that is not necessarily contained in the most recent update zone 310 for the purpose of recognizing the pattern of text.

At 440, the process 400 can include causing the client device to present the predicted text rendering prior to receiving the ground truth text rendering from the host computing system. For example, the processing circuitry 117 can execute the predictive text rendering function 122 to cause the client device 110 to present the predicted text rendering generated at 430 via the display 112. The processing circuitry 117 can send a signal to the display 112 to control the display 112 such that the display 112 adjusts one or more pixel values associated with the display 112 in accordance with the predicted rendering generated at 430. For example, the client device can cause the display 112 to present the character 'l' in the prediction zone 320.

In some examples, the generating of the predicted text rendering at 430, the presenting of the predicted text rendering at 440, or both can also be responsive to the client device 110 determining that a condition or set of conditions is satisfied and, thus, the generating at 430 and/or the presenting at 440 should indeed proceed (e.g., be activated). In the event that the condition or set of conditions are not satisfied, the client device 110 can bypass 430 and/or 440 and, instead, await the ground truth text rendering from the host computing system 140 to update the virtual desktop application window 113 based on received keystrokes. For example, the client device 110 can execute the predictive text rendering function 122 to determine that the predicted text rendering generated by the predictive text generating function 121 should indeed be presented by the client device 110 via the display 112. For example, the client device 110 can execute the predictive text rendering function 122 to determine that the latency period associated with a network connection between the client device 110 and the host computing system 140 (e.g., a connection via the network 130) exceeds a latency threshold, and therefore the predicted text rendering generated by the predictive text generating function 121 at 430 should indeed be presented by the client device 110 via the display 112. As another example, the client device 110 can execute the predictive text rendering function 122 to determine that the accuracy of a prior-generated predicted text rendering generated by the predictive text generating function 121 exceeds an accuracy threshold, and therefore the predicted text rendering generated by the predictive text generating function 121 at 430 should indeed be presented by the client device 110 via the display 112.

After the client device 110 receives the ground truth text rendering from the host computing system 140, the client device 110 can then be caused to replace the predicted text rendering presented at 440 with the ground truth text rendering received from the host computing system 140. For example, the client device 110 can receive a screen update from the host computing system 140. The screen update can include pixel information for use by the client device 110 to render the virtual desktop application window 113 on the display 110. The client device 110 can at least temporarily store the screen update in the current screen buffer 128. The client device 110 can then search the screen update for character glyphs. Responsive to searching the screen update for character glyphs, the client device 110 can then determine whether the screen update contains pixel updates corresponding to characters previously typed (e.g., characters stored in the keystroke buffer 126). If the client device 110 does determine that the screen update contains pixel updates that correspond to characters that were previously typed, then the client device 110 can determine the pattern of the text being entered (e.g., the color, the font, the spacing, the size, etc.) using OCR techniques. For example, the client device can use OCR techniques to analyze one or more characters in the most recent update zone 310 to determine the pattern.

The client device 110 can store predicted text renderings generated by the predictive text generating function 121 (and potentially rendered by the predictive text rendering function 122) as well as ground truth text renderings received by the client device 110 from the host computing system 140 in the rendering records 127. Then, when the client device 110 receives a new screen update from the host computing system 140, the client device 110 can determine whether or not a recent predictive text rendering matches an associated ground truth text rendering contained in the new screen update received from the host computing system 140. If the recent predictive text rendering does not match the associated ground truth text rendering contained in the new screen update received from the host computing system 140, then the client device 110 can render the new screen update received from the host computing system 140 directly via the display 112. However, if the recent predictive text rendering does in fact match the associated ground truth text rendering contained in the new screen update received from the host computing system 140, the client device 110 can either replace the predicted text rendering with the received ground truth text rendering, or the client device 110 can update the predicted text rendering.

Various implementations of the client device 110 updating the predicted text rendering instead of replacing the predicted text rendering with the associated ground truth text rendering received from the host computing system 140 are possible. The host computing system 140 can identify an active application (e.g., identify the text processing application window 114 as being associated with a word processing software application) and interrogate the application to learn the text pattern directly. Then, the host computing system 140 can share the text pattern with the client device 110 such that the client device 110 can conserve computing resources that it would otherwise use to learn the text pattern itself. The host computing system 140 can also learn the text pattern in a similar manner as the client device 110 as described above (e.g., analyzing the most recent update zone 310) without interrogating the active application, and then share the text pattern with the client device 110. Moreover, to conserve bandwidth, if keystroke inputs received by the client device 110 are indicative of erasure of text (e.g., backspace key, delete key, etc.), the client device 110 can simply delete corresponding predicted text renderings rather than requiring a full screen update from the host computing system 140.

Moreover, the client device 110 can share any predicted text renderings generated responsive to executing the predictive text generating function 121 (and rendered responsive to executing the predictive text rendering function 122) with the host computing system 140, and the host computing system 140 can send a correction to the predicted text renderings generated responsive to executing the predictive text generating function 121 (and rendered responsive to executing the predictive text rendering function 122), rather than sending a full screen update as a replacement. This approach can provide bandwidth savings by reducing the amount of data transmission required over the network 130. For example, the host computing system 140 could send a smaller collection of pixel data needed to correct or otherwise updated a predicted text rendering, rather than sending an entire screen update. In this scenario, the client device 110 can send the predicted pixels it renders to the host computing system 140, or the client device 110 can also communicate the predictions it makes regarding text renderings to the host computing system 140 in a simpler manner. Further, the host computing system 140 can execute the predictive text generating function 121 such that minimal information is exchanged just to confirm that both the host computing system 140 and the client device 110 arrive at the same result. The host computing system 140 can then again send much simpler correction data to the client device 110 in such a scenario rather than sending a full screen update.

In some examples, certain steps of the process 400 can be repeated as appropriate. Also, while the steps of process 400 are shown in a particular order in FIG. 4, the process 400 may not include all steps shown, may include additional steps, or may include the steps in a different order. For example, the process 400 can loop back and repeat itself each time the client device 110 receives a new keystroke input entered by a user of the client device 110 via the keyboard 115.

In some examples, aspects of the technology, including computerized implementations of methods according to the technology, can be implemented as a system, method, apparatus, or article of manufacture using standard programming or engineering techniques to produce software, firmware, hardware, or any combination thereof to control a processor, also referred to as an electronic processor, (e.g., a serial or parallel processor chip or specialized processor chip, a single- or multi-core chip, a microprocessor, a field programmable gate array, any variety of combinations of a control unit, arithmetic logic unit, and processor register, and so on), a computer (e.g., a processor operatively coupled to a memory), or another electronically operated controller to implement aspects detailed herein.

Accordingly, for example, examples of the technology can be implemented as a set of instructions, tangibly embodied on a non-transitory computer-readable media, such that a processor can implement the instructions based upon reading the instructions from the computer-readable media. Some examples of the technology can include (or utilize) a control device such as, e.g., an automation device, a special purpose or programmable computer including various computer hardware, software, firmware, and so on, consistent with the discussion herein. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

Certain operations of methods according to the technology, or of systems executing those methods, can be represented schematically in the figures or otherwise discussed herein. Unless otherwise specified or limited, representation in the figures of particular operations in particular spatial order can not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular examples of the technology. Further, in some examples, certain operations can be executed in parallel or partially in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component can be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) can reside within a process or thread of execution, can be localized on one computer, can be distributed between two or more computers or other processor devices, or can be included within another component (or system, module, and so on).

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as, e.g., "either," "one of," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g., "one or the other but not both") when preceded by terms of exclusivity, such as, e.g., "either," "one of," "only one of," or "exactly one of."

Although the present technology has been described by referring to certain examples, workers skilled in the art will recognize that changes can be made in form and detail without departing from the scope of the discussion.

The invention claimed is:

1. A method, comprising:

receiving a keystroke input associated with a virtual desktop application window on a client device that is entered via the client device;

transmitting the keystroke input associated with the virtual desktop application window to a host computing system that processes the keystroke input to provide a ground truth text rendering associated with the keystroke input for presentation by the client device via the virtual desktop application window;

based on applying an optical character recognition technique to a portion of the virtual desktop application window that receives the keystroke input, detecting a font of preceding text to the keystroke input;

generating, based on the detected font of the preceding text, a predicted text rendering associated with the keystroke input prior to receiving the ground truth text rendering from the host computing system; and based on an accuracy level associated with a predictive text rendering function satisfying an accuracy threshold, causing the client device to present the predicted text rendering via the virtual desktop application window prior to receiving the ground truth text rendering from the host computing system.

2. The method of claim 1, comprising:

receiving the ground truth text rendering from the host computing system; and causing the client device to replace the predicted text rendering with the ground truth text rendering after receiving the ground truth text rendering from the host computing system.

3. The method of claim 1, comprising:

generating a second predicted text rendering associated with a second keystroke input that is entered via the client device prior to the keystroke input; and comparing the second predicted text rendering to a second ground truth text rendering received from the host computing system based on the second keystroke input to determine the accuracy level associated with the predictive text rendering function.

4. The method of claim 3, wherein generating the second predicted text rendering associated with the second keystroke input comprises generating the second predicted text rendering without causing the client device to present the second predicted text rendering via the virtual desktop application window.

5. The method of claim 1, comprising:

determining that a latency period associated with a network connection between the client device and the host computing system exceeds a latency threshold; and generating the predicted text rendering prior to receiving the ground truth text rendering from the host computing system responsive to determining that the latency period associated with the network connection between the client device and the host computing system exceeds the latency threshold.

6. The method of claim 1, wherein the predicted text rendering comprises a font, a font size, a text color, a background color, a level of spacing, and a location within the virtual desktop application window.

7. The method of claim 1, wherein generating the predicted text rendering associated with the keystroke input comprises generating the predicted text rendering based on text that is already presented via the virtual desktop application window on the client device.

8. The method of claim 1, comprising:

storing the keystroke input in a buffer on the client device; and at least partially clearing the buffer responsive to determining that a clear condition has been met.

9. The method of claim 8, wherein determining that the clear condition has been met comprises determining that the buffer contains a maximum number of entries, determining that a timeout period has elapsed, or determining that a predetermined keystroke combination has been received.

10. The method of claim 1, comprising:

transmitting the predicted text rendering to the host computing system;

receiving a correction from the host computing system; and causing the client device to correct the predicted text rendering presented via the virtual desktop application window based on the correction after receiving the correction from the host computing system.

11. The method of claim 3, comprising:

receiving a third input associated with the virtual desktop application window, the third input comprising a predetermined keystroke combination or a mouse action; and deactivating the predictive text rendering function responsive to receiving the third input.

12. A computing device, comprising:

memory; and processing circuitry to execute instructions stored in the memory to:

receive a keystroke input associated with a virtual desktop application window presented by the computing device;

transmit the keystroke input associated with the virtual desktop application window to a host computing system that processes the keystroke input to provide a ground truth text rendering associated with the keystroke input for presenting by the computing device;

based on applying an optical character recognition technique to a portion of the virtual desktop application window that receives the keystroke input, detect a font of preceding text to the keystroke input;

generate, based on the detected font of the preceding text, a predicted text rendering associated with the keystroke input prior to receiving the ground truth text rendering from the host computing system; and based on an accuracy level associated with a predictive text rendering function satisfying an accuracy threshold, cause the computing device to present the predicted text rendering via the virtual desktop application window prior to receiving the ground truth text rendering from the host computing system.

13. The computing device of claim 12, the processing circuitry to execute instructions stored in the memory to:

generate a second predicted text rendering associated with a second keystroke input that is entered prior to the keystroke input; and compare the second predicted text rendering to a second ground truth text rendering received from the host computing system based on the second keystroke input to determine the accuracy level associated with the predictive text rendering function.

14. The computing device of claim 13, the processing circuitry to generate the second predicted text rendering associated with the second keystroke input without causing the computing device to present the second predicted text rendering via the virtual desktop application window.

15. The computing device of claim 12, the processing circuitry to execute instructions stored in the memory to:

determine that a latency period associated with a network connection between the computing device and the host computing system exceeds a latency threshold; and generate the predicted text rendering prior to receiving the ground truth text rendering from the host computing system responsive to determining that the latency period associated with the network connection between the computing device and the host computing system exceeds the latency threshold.

16. The computing device of claim 13, the processing circuitry to execute instructions stored in the memory to:

receive a third input associated with the virtual desktop application window, the third input comprising a keystroke combination or a mouse action; and deactivate the predictive text rendering function responsive to receiving the third input.

17. One or more non-transitory computer-readable storage media having instructions stored thereon that, when executed by processing circuitry, cause the processing circuitry to:

receive a keystroke input associated with a virtual desktop application window accessed via a client device;

transmit the keystroke input associated with the virtual desktop application window to a host computing system that processes the keystroke input to provide a ground truth text rendering associated with the keystroke input for presentation by the client device via the virtual desktop application window;

based on applying an optical character recognition technique to a portion of the virtual desktop application window that receives the keystroke input, detect a font of preceding text to the keystroke input;

generate, based on the detected font of the preceding text, a predicted text rendering associated with the keystroke input prior to receiving the ground truth text rendering from the host computing system; and based on an accuracy level associated with a predictive text rendering function satisfying an accuracy threshold, cause the client device to present the predicted text rendering via the virtual desktop application window prior to receiving the ground truth text rendering from the host computing system.

18. The one or more computer-readable media of claim 17, wherein the instructions, when executed by the processing circuitry, cause the processing circuitry to:

generate a second predicted text rendering associated with a second keystroke input that is entered prior to the keystroke input; and compare the second predicted text rendering to a second ground truth text rendering received from the host computing system based on the second keystroke input to determine the accuracy level associated with the predictive text rendering function.

19. The one or more computer-readable media of claim 18, wherein the instructions, when executed by the processing circuitry, cause the processing circuitry to:

receive a third input associated with the virtual desktop application window, the third input comprising a keystroke combination or a mouse action; and deactivate the predictive text rendering function responsive to receiving the third input.

20. The one or more computer-readable media of claim 17, wherein the instructions, when executed by the processing circuitry, cause the processing circuitry to:

determine that a latency period associated with a network connection between the client device and the host computing system exceeds a latency threshold; and generate the predicted text rendering prior to receiving the ground truth text rendering from the host computing system responsive to determining that the latency period associated with the network connection between the client device and the host computing system exceeds the latency threshold.

* * * * *